(12) United States Patent
Schneider et al.

(10) Patent No.: US 11,976,741 B2
(45) Date of Patent: May 7, 2024

(54) ELECTROHYDRAULIC SYSTEM HAVING AN ADJUSTMENT DEVICE FOR A VALVE

(71) Applicant: Robert Bosch GmbH, Stuttgart (DE)

(72) Inventors: Juergen Schneider, Wiesen (DE); Alexandre Orth, Hettstadt (DE); Gottfried Hendrix, Gemuenden (DE); Oliver Gerhard, Zellingen (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 17/437,670

(22) PCT Filed: Mar. 9, 2020

(86) PCT No.: PCT/EP2020/056135
§ 371 (c)(1),
(2) Date: Sep. 9, 2021

(87) PCT Pub. No.: WO2020/187615
PCT Pub. Date: Sep. 24, 2020

(65) Prior Publication Data
US 2022/0163133 A1 May 26, 2022

(30) Foreign Application Priority Data
Mar. 15, 2019 (DE) .................... 10 2019 203 514.0

(51) Int. Cl.
*F16K 31/04* (2006.01)
*F16K 31/163* (2006.01)
*F16K 31/56* (2006.01)

(52) U.S. Cl.
CPC ........ *F16K 31/043* (2013.01); *F16K 31/1635* (2013.01); *F16K 31/563* (2013.01)

(58) Field of Classification Search
CPC ... F16K 31/043; F16K 31/1635; F16K 31/563
See application file for complete search history.

(56) References Cited

U.S. PATENT DOCUMENTS 1,517,728 A * 12/1924 Heath ................. F16K 31/1635
92/130 C
3,042,357 A * 7/1962 Engholdt .............. F16K 31/043
236/74 R (Continued)

FOREIGN PATENT DOCUMENTS

DE 10 2010 041 704 A1 4/2012
EP 1 330 419 A 9/1973

(Continued)

OTHER PUBLICATIONS

International Search Report corresponding to PCT Application No. PCT/EP2020/056135, dated May 26, 2020 (German and English language document) (6 pages).

*Primary Examiner* — Umashankar Venkatesan
(74) *Attorney, Agent, or Firm* — Maginot, Moore & Beck LLP

(57) ABSTRACT

An electrohydraulic system having an adjustment device for a valve includes a drive apparatus, a control apparatus, and a preloading apparatus. In the event of a fault, the energy stored in the preloading apparatus can be transferred to the control apparatus such that a rotational motion of the control apparatus begins, which leads to the adjustment of the valve. The preloading apparatus comprises at least one elastic element, which is arranged adjacent to a control shaft of the control apparatus, is stationarily connected to the control shaft, and applies a torque to the control shaft.

16 Claims, 9 Drawing Sheets

(56) References Cited

U.S. PATENT DOCUMENTS

| | | | | |
|---|---|---|---|---|
| 4,757,684 A * | 7/1988 | Wright | ............... | G05G 15/00 251/71 |
| 6,895,994 B2 * | 5/2005 | Zeng | ............... | F16L 55/1015 137/460 |
| 7,650,905 B2 * | 1/2010 | Kubota | ............ | F16K 31/1635 137/554 |
| 11,098,822 B2 * | 8/2021 | Götz | ............ | F16K 37/0008 |
| 2006/0065866 A1 | 3/2006 | Alfieri | | |
| 2013/0333894 A1 * | 12/2013 | Geiger | ............... | E21B 34/04 166/336 |
| 2020/0096132 A1 * | 3/2020 | Fassbender | ......... | F16K 31/1635 |

FOREIGN PATENT DOCUMENTS

| | | | | |
|---|---|---|---|---|
| GB | 1330419 A * | 9/1973 | ........ | F16K 31/043 |
| GB | 2 378 744 A | 2/2003 | | |
| WO | 2018/071321 A1 | 4/2018 | | |

\* cited by examiner

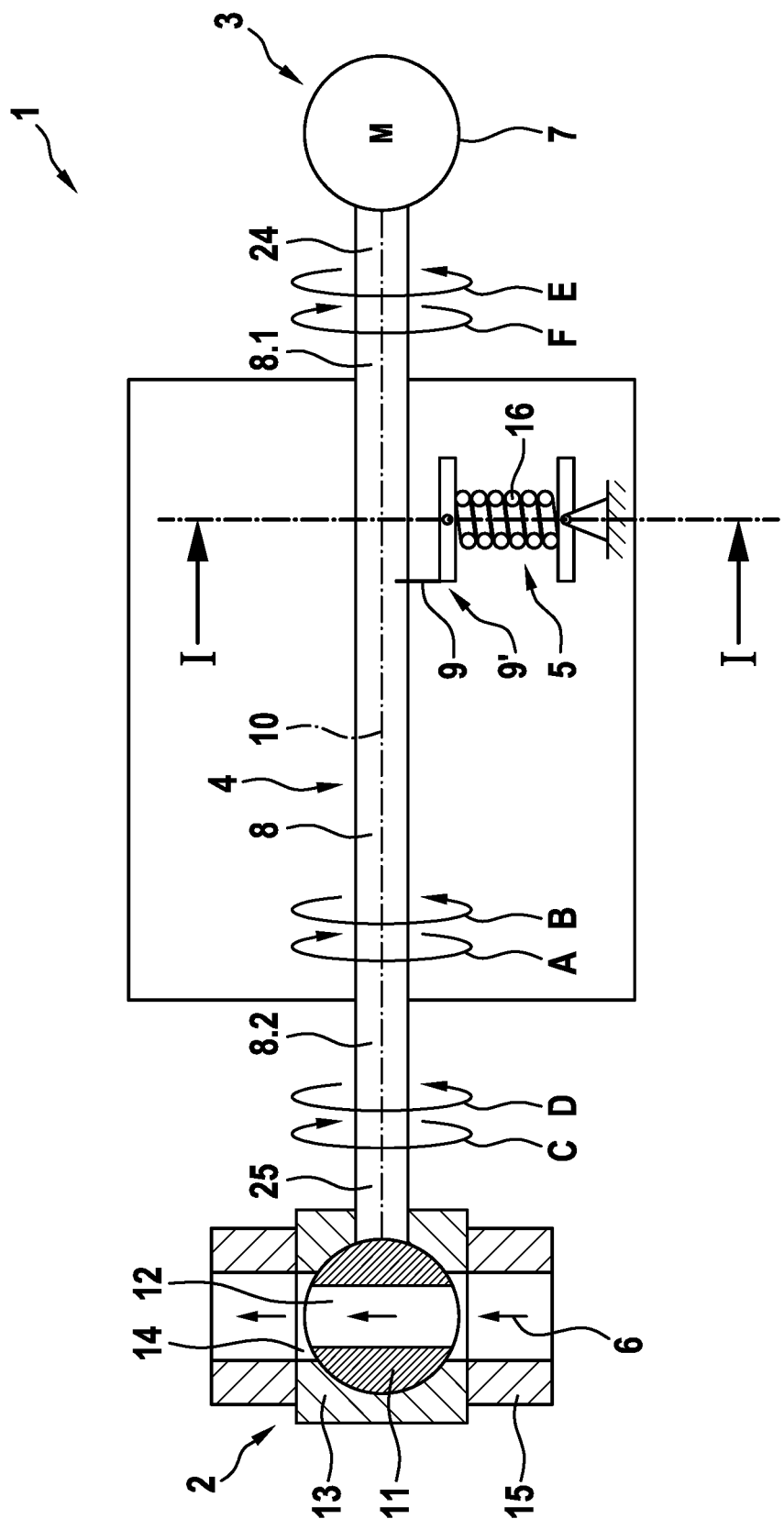

ELECTROHYDRAULIC SYSTEM HAVING AN ADJUSTMENT DEVICE FOR A VALVE

This application is a 35 U.S.C. § 371 National Stage Application of PCT/EP2020/056135, filed on Mar. 9, 2020, which claims the benefit of priority to Serial No. DE 10 2019 203 514.0, filed on Mar. 15, 2019 in Germany, the disclosures of which are incorporated herein by reference in their entirety.

The disclosure relates to an electrohydraulic system having an adjustment device for a valve, with a drive means, with an actuating means, and with a pretensioning means, wherein the energy stored in the pretensioning means can be transmitted to the actuating means in the event of a fault such that rotational movement of the actuating means is initiated which causes the rotationally operable valve to be adjusted.

BACKGROUND

Such electrohydraulic systems with process valves can be used in multiple industrial applications, for example offshore or onshore oil and gas production.

Such electrohydraulic systems are used especially in order to move an element underwater at water depths of up to several thousand meters in the context of the conveying of crude oil and natural gas, mining, scientific investigations, or infrastructure projects. Thus, process valves by means of which the volume flow of the medium to be conveyed can be regulated or shut off are found, for example, at great depths in offshore oil and gas production facilities.

In a known device, the actuating means takes the form of an actuating drive for operating a valve by means of an actuating element. Associated with this actuating drive is an emergency operation means via which the actuating element can be reset in the event of a fault essentially independently of the activation of the actuating drive. This emergency operation means has an energy storage system, the stored energy of which can be released for resetting purposes. The emergency operation means hereby has a piston which is acted upon, on the one hand, by the energy storage system and, on the other hand, by pressure in a pressure chamber which can be connected to a tank or the like via a switch valve, in order to release the energy stored in the energy storage system. The piston is here designed in such a way that it shifts the actuating element in a resetting direction when the pressure in the pressure chamber is reduced. The linear displacement of the piston in an emergency is converted by a linearly displaceable driver into a likewise linear movement of the actuating element (console) via which the valve is closed. The linear displacement means is neither provided nor suitable for closing a rotationally operable valve. A particular drawback is that it is not possible to transmit torque to the valve using the linear movement.

Even though the known solution has already proven to be very comfortable and reliable, it cannot always be used, for example when there are particular space requirements or positions of the actuating drive. It is in these situations that a new concept is required.

SUMMARY

Against this background, the object of the present disclosure is to provide an electrohydraulic system having an adjustment device which alleviates or even avoids the disadvantages mentioned. It is in particular intended to achieve a compact structure, namely a small structural space and an increased lifetime. It is moreover intended to achieve effective adjustment of the rotational actuating drive in a simple fashion. Lastly, it is intended that the rotationally operable valve should close reliably in the event of a failure of the energy supply.

These objects are achieved with an arrangement described below. It should be pointed out that the description, in particular in conjunction with the drawings, introduces further details and developments of the invention arrangement which can be combined with the features disclosed herein from the claims.

An electrohydraulic system having an adjustment device for a valve, with an actuating means and a pretensioning means, contributes to achieving these objects, wherein the energy stored in the pre-tensioning means can be transmitted to the actuating means in the event of a fault such that a rotational movement of the actuating means is initiated which causes the valve to be adjusted. The pretensioning means here comprises at least one elastic element which is arranged adjacent to an actuating shaft of the actuating means and is connected fixedly to the actuating shaft and exerts a torque on the actuating shaft.

It is possible for a plurality of elastic elements to be arranged (in series and/or in parallel with respect to each other). A plurality of elastic elements can be combined as a pack. The elastic element is in particular formed with a metal. It has in particular an outer shape which can be modified elastically.

The elastic element is arranged adjacent to the actuating shaft. This means in particular that a center axis of the elastic element is not arranged coaxially with and/or parallel to the actuating shaft. It is preferred that a center axis of the elastic element is not arranged perpendicular to and flush with the actuating shaft. It is preferred that a center axis of the elastic element is arranged obliquely, tangentially, in a slanted fashion with respect to the actuating shaft, or is oriented parallel to a tangent to the actuating shaft.

The elastic element is fixedly connected (directly or indirectly) to the actuating shaft. This means, in other words, that a force-introduction point acting on the actuating shaft is unvarying with respect to the position relative to the actuating shaft. This can be achieved by the elastic element and the actuating shaft being rigidly connected to each other, i.e. the elastic element is, for example, mounted, welded, etc on or to (the surface of) the actuating shaft. In particular, the force-introduction point does not move relative to (the surface of) the actuating shaft.

The at least one elastic element is additionally provided, positioned, and/or configured such that it can exert a torque on the actuating shaft (at least in an "active" position—emergency operation). The torque is in particular such that it enables or effects a resetting or rotation of the actuating shaft over a predeterminable angular range.

The electrohydraulic system presented here comprises an enclosed emergency drive with a mechanical energy storage system (here by means of the at least one elastic element). The energy stored in the elastic element (for example, a spring) is converted into a rotational movement via a mechanical spindle or via a hydraulic motor. In both cases, the spring can be maintained under tension during normal operation by a hydraulic cylinder which is shut off via a valve. When the valve opens (for example, owing to a power failure), the cylinder is pushed by the spring and the energy is released. The rotational movement causes, in the event of an emergency, the immediate adjustment and hence rapid closing of a rotationally operated valve. The actuating means is triggered in a rapid and fail-safe manner.

An emergency safety module for rotary shafts, in particular process valves, is provided by means of the present device without the use of electric batteries. The module can be replaced underwater and enables the valve to be operated by an external actuator or robot.

A rotationally operable actuator which can be exchanged using a standard interface (for example, an ROV=remotely operated vehicle or an AUV=autonomous underwater vehicle) is preferred for multiple applications in offshore and onshore oil and gas production. A fail-safe and closing mechanism for rotational actuators is formed by the electrohydraulic system presented here, using a spring system and a hydraulic regulating system (with no electric batteries), which can be replaced and operated by an external actuator or underwater robot or vehicle (for example, an ROV or an AUV).

The fail-safe mechanism for rotationally operable valves does not use batteries and instead employs springs with a reliable hydraulic control system which can also be replaced underwater and can have a spindle drive or a hydraulic motor and/or also contain a complete drive system (i.e. not only safety functions but also normal operational tasks).

The adjustment device presented here takes the form of a fail-safe mechanism with a spring system, wherein the safety control system is integrated into a hydraulic control system, i.e. an electric drive means is decoupled and a required torque and a rotational movement is provided in order to move a process valve into a safe (closed) position and hold it in this position.

The emergency safety module for rotationally operated process valves makes possible a high safety and reliability level for a long operating life (for example, 25 years). It can be used as an independent module, both to supplement existing electrical actuators or as a standalone actuator. The module can be replaced easily underwater; the operation of an external tool or actuator can be deactivated by an electrohydraulic control system (no block).

The drive device for the adjustment device can be a remote operated vehicle (ROV) or an autonomous underwater vehicle (AUV) or a robot. A spindle or a hydraulic motor with a rotary drive can preferably be considered as the actuating means. The actuating means is preferably configured to drive the valve in rotation, for example a process valve.

The valves can preferably be shut-off valves for shutting off and opening a line. Conical-seat valves which can be adjusted hydraulically via a hydraulic motor or mechanically via a spindle are furthermore preferably used as valve elements. The closing force generated by the counter-pressure causes an elastic deformation at the support element. Leak-free sealing is ensured when there is sufficient closing force. A valve cone is hereby pressed onto a housing seat by a movement spindle. The threaded nut can lie inside the housing. The movement spindle is preferably driven via an actuating drive which performs a rotational movement. The movement spindle with the valve cone is displaced linearly when the valve is opened and closed, whilst the threaded nut remains stationary. Ball elements with a through bore can also be used which are housed in a seal and open or shut off the opening when rotated by 90°. The ball element and the actuating drive are hereby stationary. Rotary slide valves can furthermore preferably be used.

The pretensioning means comprises at least one spring element, for example a helical compression spring or another spring element. The pretensioning means can interact with a piston which delimits a liquid-filled pressure chamber which is configured so as to shift the actuating means in a resetting direction (closing direction) when the pressure in the pressure chamber is reduced.

The elastic element preferably comprises at least one spring system with at least one pretensioning spring. The pretensioning spring is preferably a helical spring.

At least one lever arm, shoulder, or the like, at one end of which the at least one pretensioning spring engages, is advantageously attached to the actuating shaft. It is particularly preferred that the at least one lever arm, shoulder, or the like bears directly on the surface of the actuating shaft and is fastened there. It is possible that a guide and/or a joint is provided which can compensate the relative movement between the actuating shaft and the elastic element and/or can transmit the required torque.

The direction of action, or the predominant direction of action, of the pretensioning spring expediently extends essentially perpendicular to but at a distance from the longitudinal axis of the actuating shaft.

The direction of action, or the predominant direction of action, of the pretensioning spring preferably extends essentially parallel to a tangent to (the surface of) the actuating shaft.

The spring system is preferably pretensioned by at least one rotatable motor.

The spring system is advantageously pretensioned by at least one hydraulic cylinder with at least one pressure piston.

The hydraulic cylinder is expediently connected via at least one duct to at least one directional control valve and, when the latter opens, the pressure chamber of the hydraulic cylinder can be displaced by the spring system.

The actuating shaft of the actuating means and the actuating shaft of the valve are preferably arranged coaxially with each other.

An (electromagnetic) tensioning means is preferably present for the pretensioning means. The electromagnetic tensioning means can in particular be configured to set and/or maintain the pretensioning.

A triggering means for the pretensioning means is advantageously provided. The triggering means can in particular be configured to relax the pretension and/or to trigger the application of torque to the actuating shaft by means of the at least one element.

A resetting means for the pretensioning means is expediently present. The resetting means can be configured to set and/or maintain the pretension of the pretensioning means in the event of the failure of an electromagnetic tensioning means provided for this purpose, wherein this is preferably effected via an alternative path, in particular using hydraulically and/or mechanically operated components.

BRIEF DESCRIPTION OF THE DRAWINGS

The disclosure and the technical environment will be explained in detail below with the aid of drawings. The same components are designated here with the same reference symbols. The views are provided schematically and not to illustrate size ratios. The explanations given with reference to individual details of a drawing can be extracted and can be freely combined with the content of other drawings or the above description unless the knowledge of a person skilled in the art stipulates otherwise and such a combination is explicitly prohibited here. In the schematic drawings:

FIG. 1a shows a side view of the adjustment device with an open valve and a tensioned pretensioning means;

FIG. 2a shows the pretensioning means in a section II-II with a helical compression spring in the tensioned position in FIG. 1a;

DETAILED DESCRIPTION

Figure 1B:
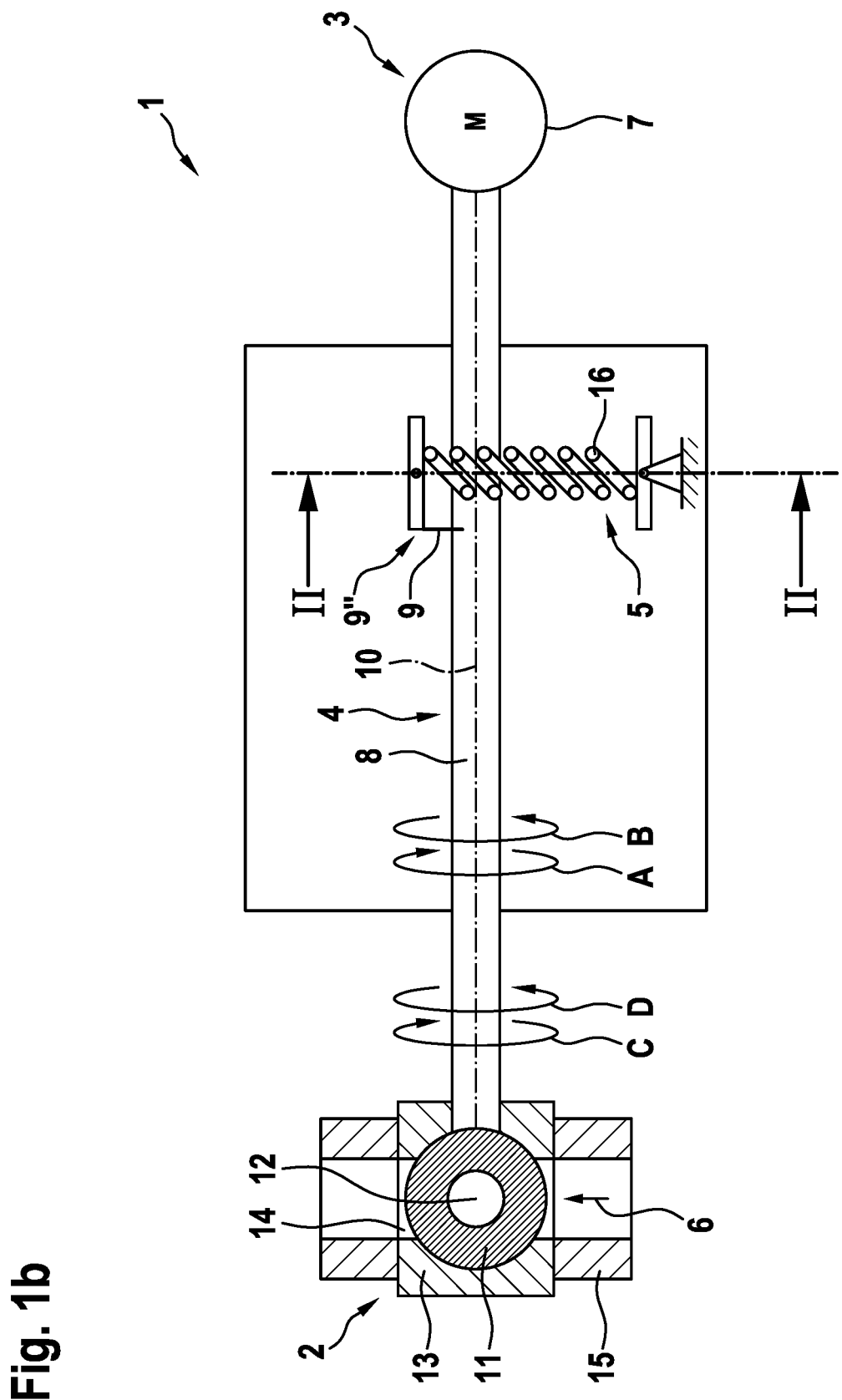
FIG. 1b shows the adjustment device in FIG. 1a with a closed valve and a relaxed pretensioning means.

FIGS. 1a and 1b show the adjustment device 1 with an open valve 2 and a tensioned pretensioning spring 16 (FIG. 1a) and with a closed valve 2 and a relaxed pretensioning spring 16 (FIG. 1b). The adjustment device 1 for a valve 2, with a drive means 3, with an actuating means 4, and with a pretensioning means 5 is shown.

The functional diagrams in FIGS. 1a and 1b show the actuating means 4 for operating the valve 2, for example a process valve, via which a volume flow 6 can be set. The actuating means 4 has a spindle drive with a drive means 3, for example an electric machine 7, which drives a spindle 8. A rotational movement of the spindle 8 is effected about the longitudinal axis 10 in the direction of the arrows A or B. In the example illustrated, the rotational movement of the spindle 8 is transmitted to a ball element 11 of the valve 2, with a through bore 12, which is mounted in sealing fashion in a valve housing 13. A valve duct 14 passes through the valve housing 13, is continued at its mouths by tubes 15, and a gaseous or liquid medium (volume flow 6) flows therein.

A cavity, in which the ball element 11 with the bore 12 (flow opening) is mounted rotatably, is formed in the valve housing 13. The ball element 11 is attached coaxially to the drive end 8.2 of the spindle 8. In the situation in FIG. 1a, the bore 12 and the valve duct are aligned with each other, the whole flow opening is unblocked, and the valve 2 is therefore open. When the ball element 11 rotates by 90° in the direction of the arrow C or D, the ball element 11 and the valve duct 14 cover each other, the flow opening is blocked, and the valve is closed (see FIG. 1b).

The electric machine 7 is arranged at the drive end 8.1 of the spindle 8. By activating the electric machine 7, it is possible in normal operation to adjust the ball element 11 of the valve 2 depending on the rotational movement of the threaded spindle 8 in the direction of the arrows C or D, via the rotational movement of the drive shaft 24 of the electric machine 7 in the direction of the arrows E and F, the rotational movement of the spindle 8 in the direction of the arrows A and B, and the rotational movement of the drive axis 25 of the valve 2 in the direction of the arrows C and D.

In the case where the valve 2 has been activated (opened) and hence a certain volume flow 6 has been set, in the event of a power failure or a system-side fault, the valve 2 would remain open such that the functioning of the process valve can no longer be controlled. For such a fault, an emergency operation means is provided by means of which the spindle can be reset to a default position in which the valve 2 is closed (FIG. 1b). In the solution shown in FIGS. 1a and 1b, this resetting is effected mechanically, there being no need for any structural elements to be operated electrically for the emergency function. The emergency operation device consists essentially of an energy storage system, in the present case consisting of the pretensioning means 5 with a pretensioning spring 16 (spring-activated mechanism).

Figure 2A:
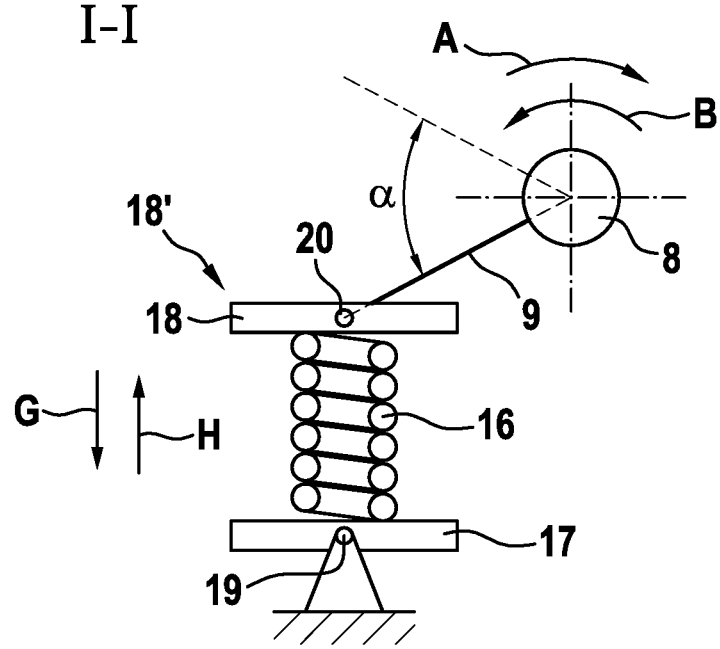
Figure 2B:
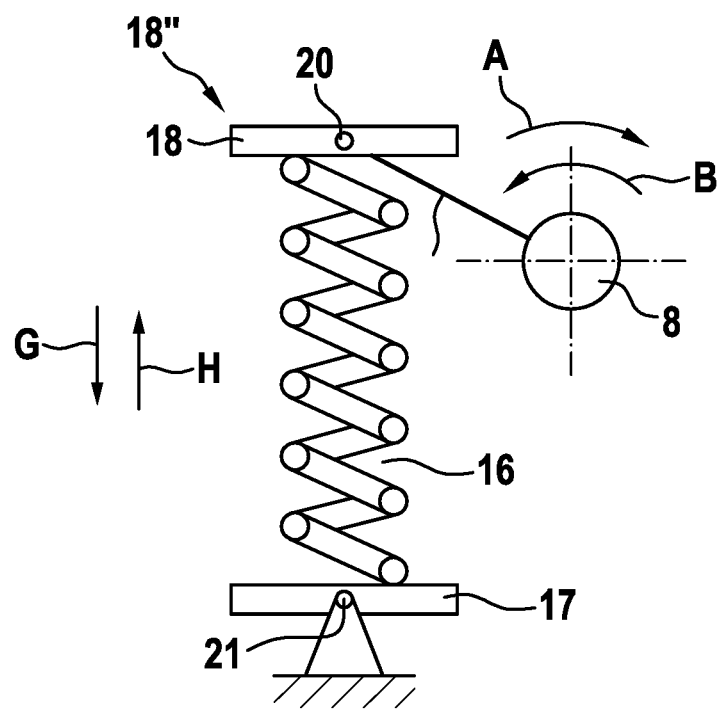
FIG. 2b shows the pretensioning means in a section II-II with a helical compression spring in the relaxed position in FIG. 1b.

As shown in FIGS. 2a and 2b, the pretensioning spring 16 is supported at one of its ends on a first support element 17 which is fastened such that it can rotate via a first pivot point 19 on a stationary pivot bearing 21. The pretensioning spring 16 is supported with its other end on a second support element 19 which engages with one end of a lever arm 9 via a second pivot point 20. The lever arm 9 or an equivalent element is fastened fixedly to the spindle, for example by adhesive bonding, welding, screws, or the like, and is consequently rigidly connected to the spindle 8.

FIGS. 1a and 2a show the pretensioning spring 16 in a tensioned position, whereas FIGS. 1b and 2b show the pretensioning spring 16 in a relaxed position. In the course of the relaxation of the pretensioning spring 16, for example a helical pressure spring, the second support element 18 moves in the direction of the arrow H from the first position 18' (FIG. 2a) into a second position 18" (FIG. 2b). The lever arm 9 is hereby pressed upward such that the spindle 8—viewed in cross-section—is rotated by an angle $\alpha=90°$ about its actuating shaft 10 (longitudinal axis). In this way, the ball element 11 of the valve 2 is likewise rotated by 90° into the closed position (FIG. 1b). The arrow G shows the direction in which the pretensioning spring 16 is tensioned.

Figure 3:
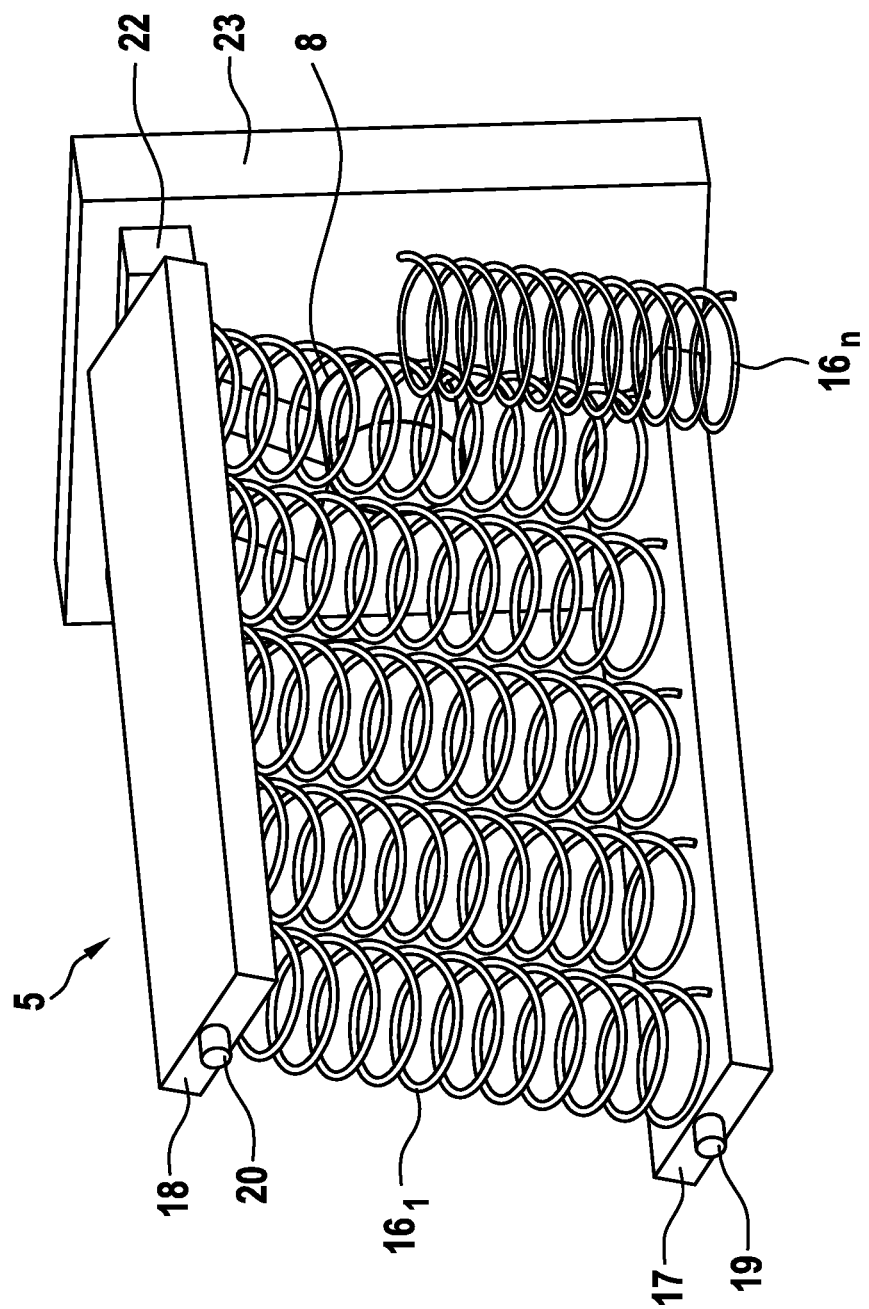
FIG. 3 shows in perspective an embodiment of the pretensioning means with a plurality of pretensioning springs.

FIG. 3 shows in perspective an embodiment of the pretensioning device 5 with a plurality of pretensioning springs $16_1$ to $16_n$ (spring pack). The pretensioning springs $16_1$ to $16_n$ can be arranged connected in series or in parallel. A track guide is designated by 22 and a retaining element for the pretensioning means 5 is designated by 23.

FIGS. 4 to 8 show different embodiments of the adjustment device 1. For the sake of simplicity, the pretensioning means 5 is shown by way of example as a helical spring. It is intended that the spindle 8 which is shown as being bent illustrates purely schematically that the movable end of the pretension means 5 is configured to exert a torque on the spindle 8.

The different designs shown in FIGS. 4 to 8 each comprise a drive for a tensioning means 26 for tensioning the pretensioning means 5, the pretensioning means 5 (fail-safe system), a triggering means 27 for the pretensioning means 5, and a resetting means 28.

Figure 4:
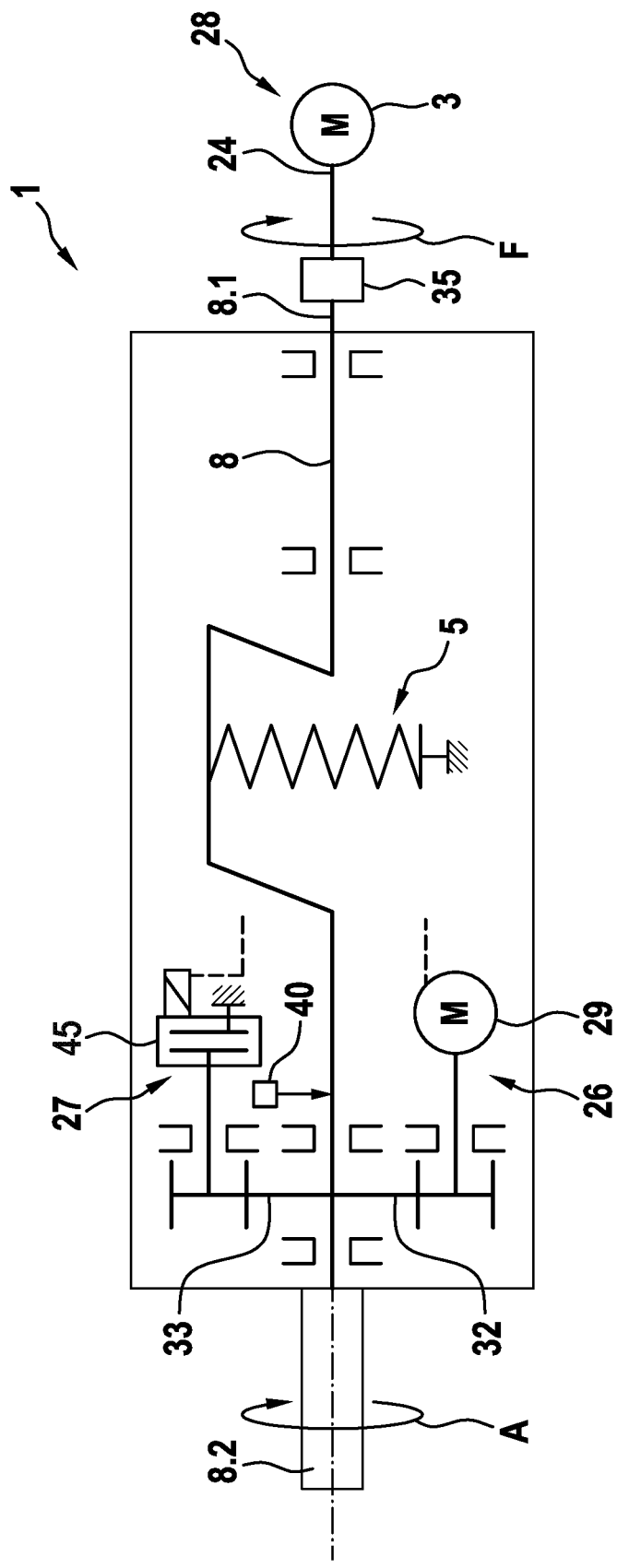
FIG. 4 shows an embodiment of the adjustment device with an electromagnetic clutch, an electromagnetic tensioning means, and a mechanical resetting means.

FIG. 4 shows an embodiment of the adjustment device 1 with the following elements: the drive for the tensioning means 26 is effected by a first electromotor 29 which interacts with the spindle 8 via a first transmission 32. The pretensioning means 5 comprises an elastic element, for example a spring element. The triggering means 27 has an electromagnetically operable clutch 45, which acts as a brake, and interacts with the spindle 8 via a second transmission 33. The resetting means 28 is substantiated in mechanical form, for example via the drive means 3 with the drive shaft 24. An interface between the drive means 3 and the spindle is designated by 35. A position detector is designated by 40.

Figure 5:
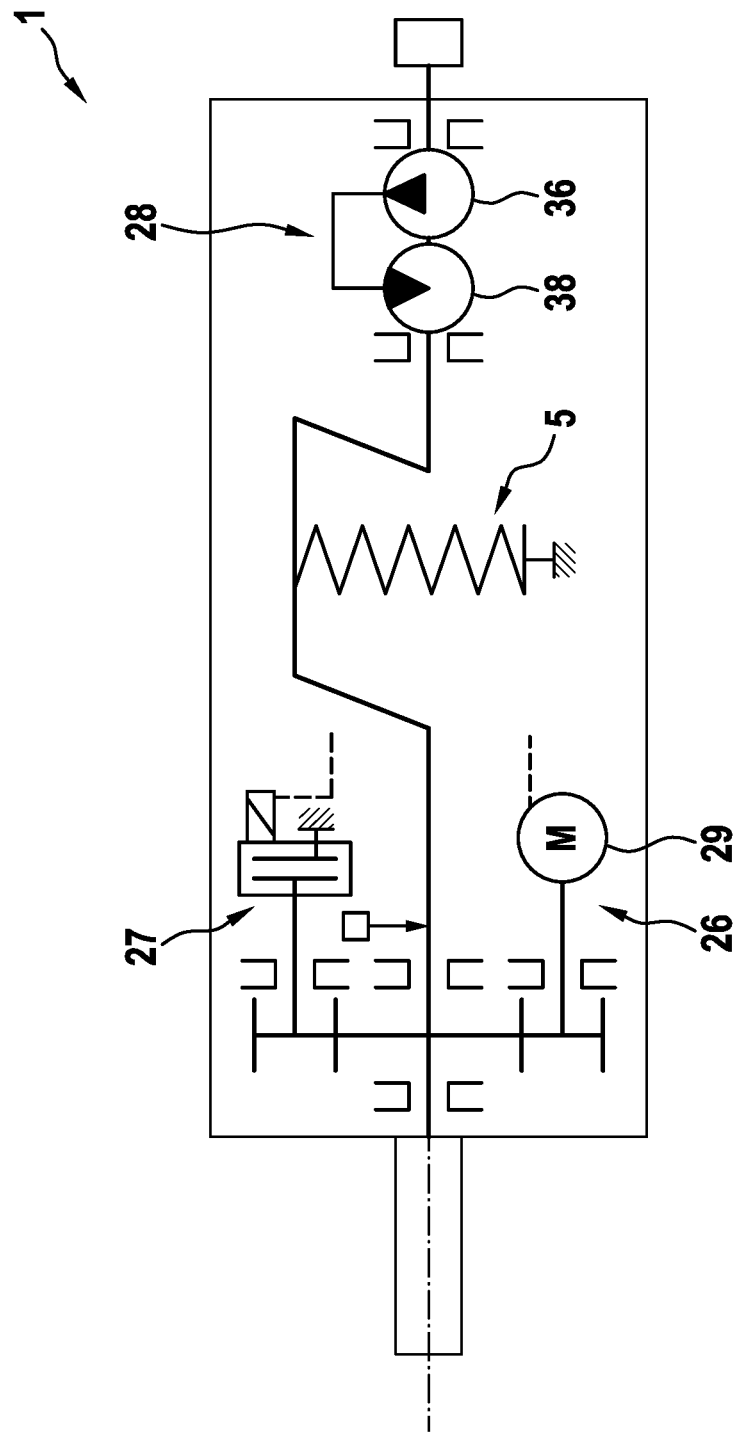
FIG. 5 shows an embodiment of the adjustment device as in FIG. 4 but with a hydraulic resetting means.

According to FIG. 5, an adjustment device 1 is provided as in FIG. 4 but with a hydraulic resetting means 28. A hydraulic circuit is present for this purpose which comprises a first hydraulic pump 36 and a hydraulic motor 38 which are arranged as a rotary drive inside the spindle between the drive means 3 (see FIG. 4) and the pretensioning means 5. This design enables a lower speed and lower forces.

Figure 6:
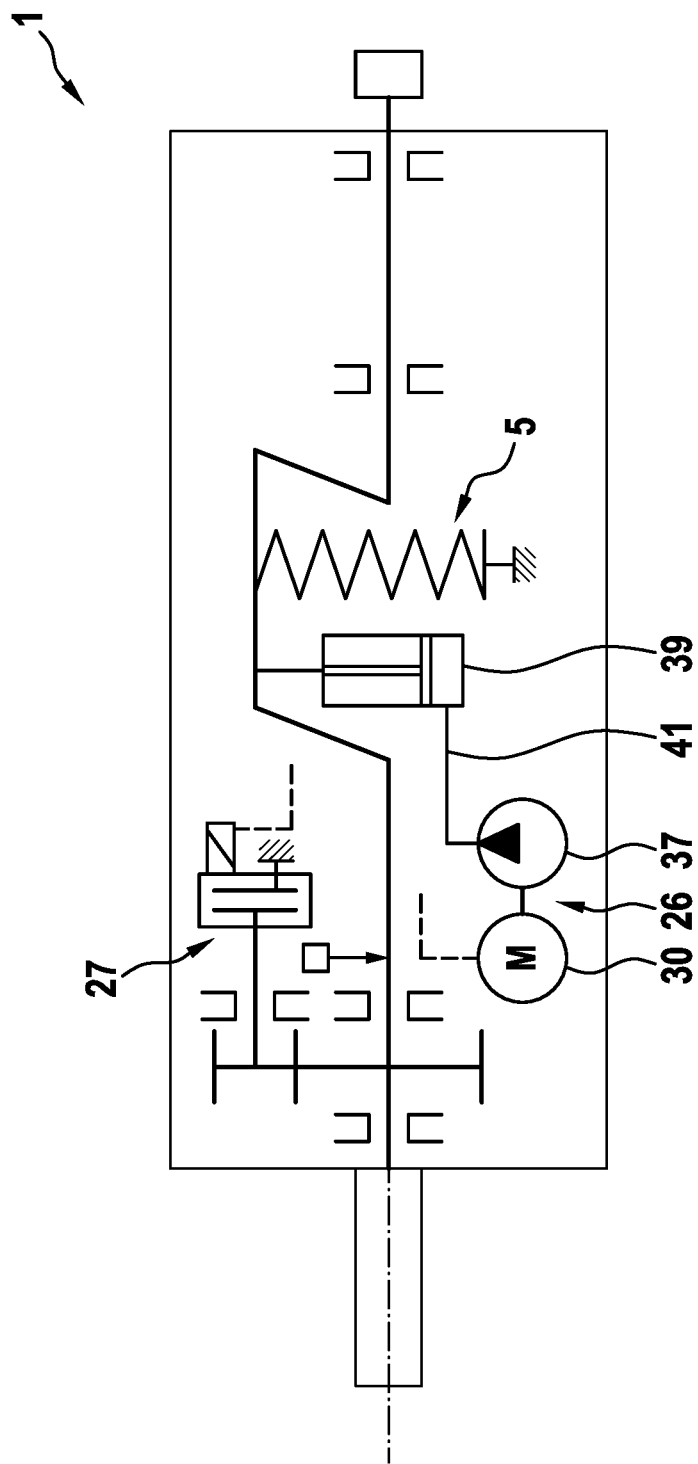
FIG. 6 shows an embodiment of the adjustment device with an electromagnetic clutch, a hydraulic tensioning means, and a mechanical resetting means.

FIG. 6 illustrates an adjustment device 1, in which the tensioning means 26 comprises a second hydraulic pump 37, driven by a second electromotor 30, which acts on a linear hydraulic cylinder 39. The tensioning means 26 is substantiated in electrohydraulic form.

Figure 7:
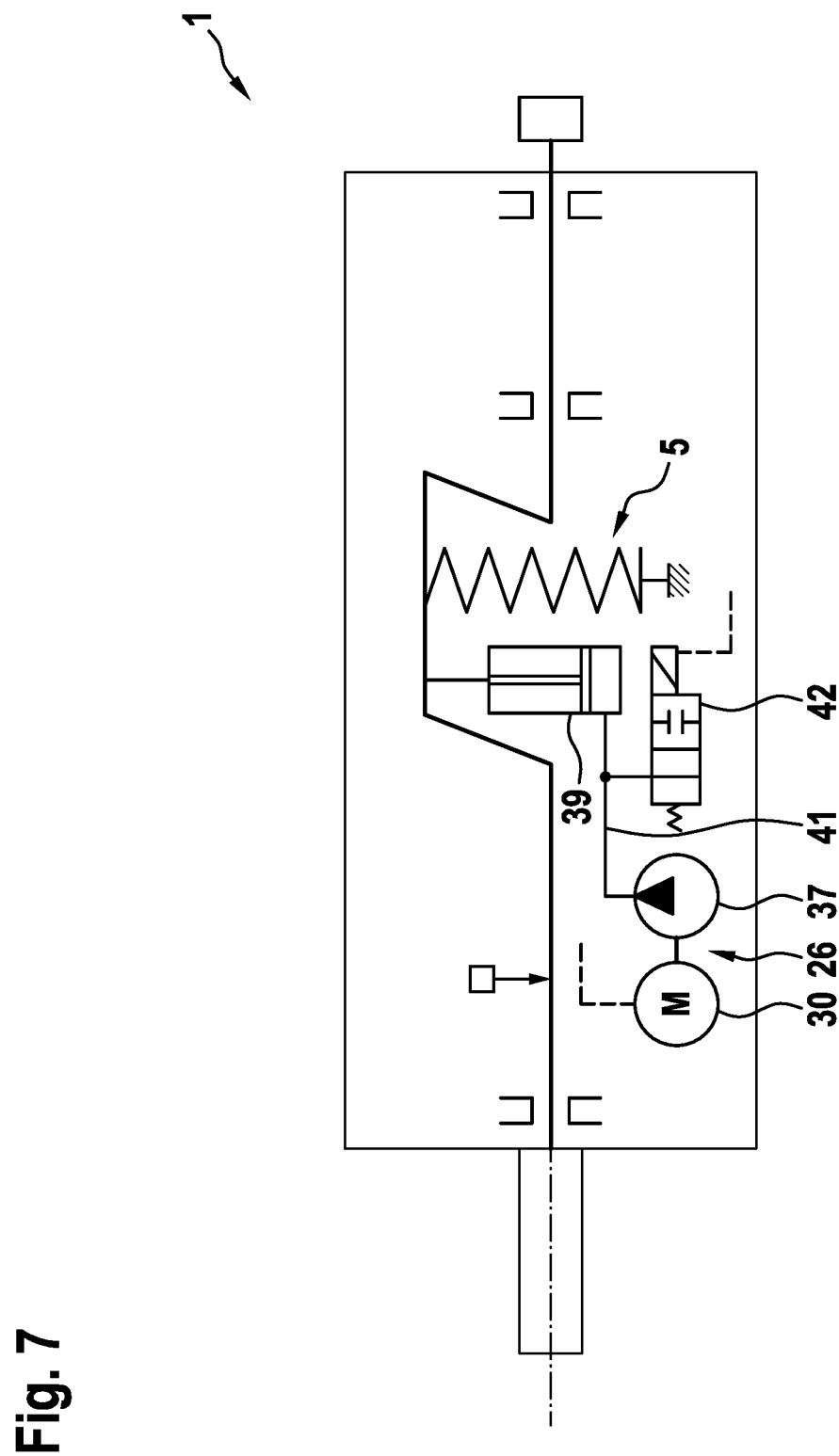
FIG. 7 shows an embodiment as in FIG. 6 but with a directional control valve between the hydraulic pump and the hydraulic cylinder.

FIG. 7 illustrates an adjustment device 1, in which a directional control valve 42 with an electromagnet and spring return is interposed between the second hydraulic pump 37 and the hydraulic cylinder 39 in a hydraulic line 41.

Figure 8:
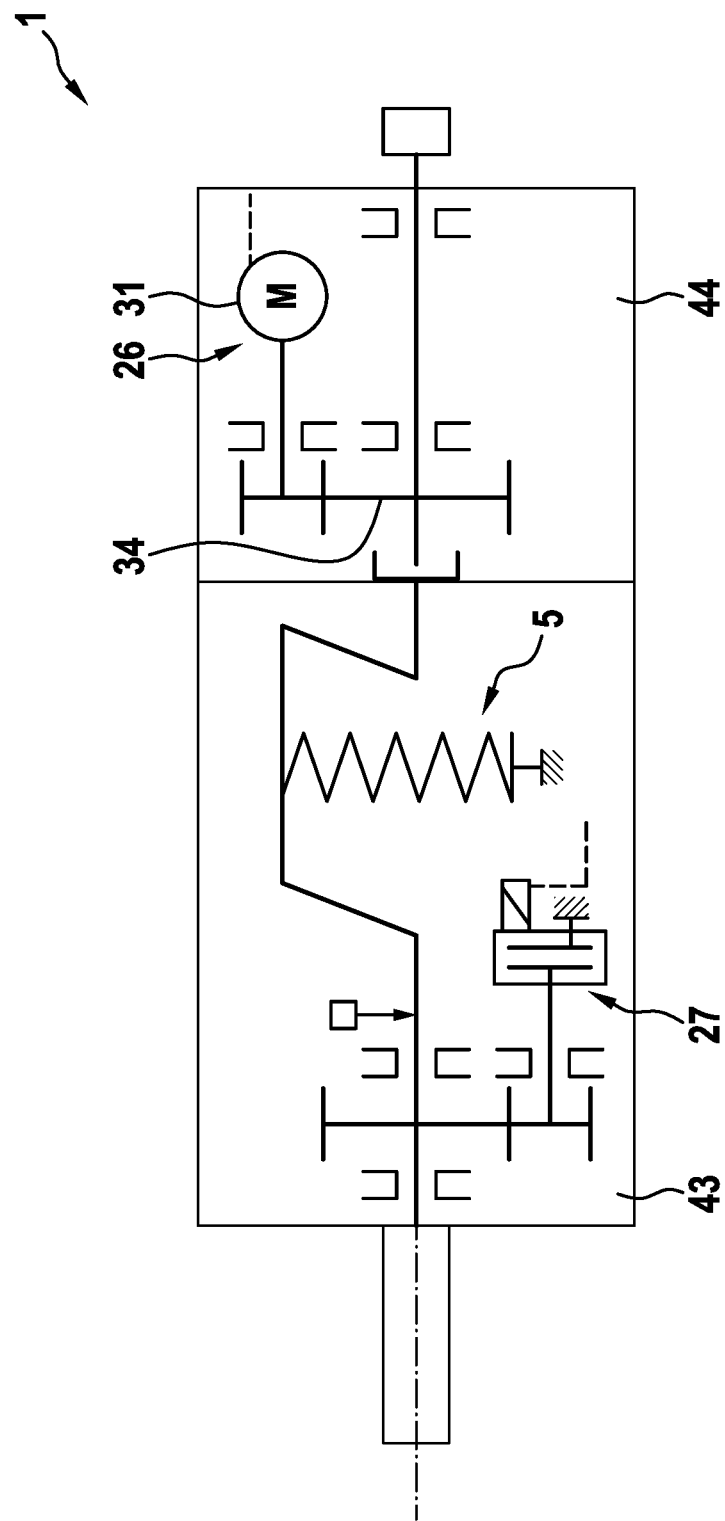
FIG. 8 shows an embodiment similar to FIG. 4 but with a module for the triggering means and the pretensioning means, and a module for the tensioning means, respectively.

FIG. 8 shows an adjustment device 1 with a first module 43 and a second module 44. The first module 43 comprises the triggering means 27 and the pretensioning means 5. The second module 44 contains the tensioning means 26. In a multi-valve system, a first module 43 can be associated with each of the valves 2. The second module 44 can be connected as required to one of the multiple first modules 43. A third transmission is designated by 34.

LIST OF REFERENCE SYMBOLS 1 adjustment device
2 valve
3 drive means
4 actuating means
5 pretensioning means
6 volume flow
7 electric machine
8 spindle
8.1 drive end
8.2 drive end
9 lever arm
10 actuating shaft
11 ball element
12 bore
13 valve housing
14 valve duct
15 tube
16 pretensioning spring
$16_1$ to $16_n$ pretensioning springs
17 first support element
18 second support element
18' first position
18" second position
19 first pivot point
20 second pivot point
21 pivot bearing
22 track guide
23 retaining element
24 drive shaft
25 drive axis
26 tensioning means
27 triggering means
28 resetting means
29 first electromotor
30 second electromotor
31 third electromotor
32 first transmission
33 second transmission
34 third transmission
35 interface
36 first hydraulic pump
37 second hydraulic pump
38 hydraulic motor
39 hydraulic cylinder
40 position detector
41 hydraulic line
42 directional valve
43 first module
44 second module
45 electromagnetically operable clutch

The invention claimed is:

1. An electrohydraulic system comprising:
an adjustment device configured to adjust a rotary valve, the adjustment device comprising:
an actuating arrangement having an actuating shaft having a first end connected to the rotary valve and a second opposite end configured to connect to and be rotated by an external actuator or robot that is external to the electrohydraulic system;
a pretensioning device configured to transmit energy stored in the pretensioning device to the actuating arrangement in the event of a fault such that rotational movement of the actuating arrangement is initiated so as to cause the valve to be adjusted, the pretensioning device including at least one elastic element arranged adjacent to the actuating shaft of the actuating arrangement and connected fixedly to the actuating shaft, the at least one elastic element being configured to exert a torque on the actuating shaft; and
a tensioning device configured to adjust and/or maintain a pretension of the pretensioning device,
wherein the tensioning device is configured to apply the pretension to the pretensioning device independently of the external actuator or robot.

2. The electrohydraulic system as claimed in claim 1, wherein the elastic element comprises at least one spring system with at least one pretensioning spring.

3. The electrohydraulic system as claimed in claim 2, further comprising at least one lever arm attached to the actuating shaft and having a first lever arm end at which the at least one pretensioning spring engages.

4. The electrohydraulic system as claimed in claim 2, wherein a direction of action of the at least one pretensioning spring extends essentially parallel to a tangent to the actuating shaft.

5. The electrohydraulic system as claimed in claim 1, wherein the tensioning device comprises at least one rotatable electromotor configured to adjust the pretension of the pretensioning device.

6. The electrohydraulic system as claimed in claim 1, wherein the tensioning device comprises at least one hydraulic cylinder having at least one linearly movable pressure piston operably coupled to the actuating shaft so as to adjust the pretension of the pretensioning device.

7. The electrohydraulic system as claimed in claim 6, wherein the tensioning device further comprises at least one directional control valve and at least one duct via which the hydraulic cylinder is connected to the at least one directional control valve, the tensioning device configured such that when the at least one directional control valve is open, the pressure piston of the hydraulic cylinder is displaceable by the pretensioning device and when the at least one directional control valve is closed, the pressure piston is not displaceable by the pretensioning device.

8. The electrohydraulic system as claimed in claim 1, wherein the actuating shaft of the actuating arrangement and a drive axis of the valve are arranged coaxially with each other.

9. The electrohydraulic system as claimed in claim 1, further comprising a triggering mechanism for the pretensioning device.

10. The electrohydraulic system as claimed in claim 9, wherein the triggering mechanism comprises an electromagnetically operable clutch configured to, in a first state, disable rotation of the actuating shaft and, in a second state, enable rotation of the actuating shaft such that the pretension of the pretensioning device rotates the actuating shaft.

11. An electrohydraulic system comprising:
   an adjustment device configured to adjust a rotary valve, the adjustment device comprising:
      an actuating arrangement having an actuating shaft having a first end connected to the rotary valve and a second opposite end configured to connect to and be rotated by an external actuator or robot that is external to the electrohydraulic system; and
      a pretensioning device configured to transmit energy stored in the pretensioning device to the actuating arrangement in the event of a fault such that rotational movement of the actuating arrangement is initiated so as to cause the valve to be adjusted, the pretensioning device including at least one elastic element arranged adjacent to the actuating shaft of the actuating arrangement and connected fixedly to the actuating shaft, the at least one elastic element being configured to exert a torque on the actuating shaft; and
      a tensioning device configured to adjust and/or maintain a pretension of the pretensioning device; and
   a resetting mechanism for the pretensioning device, the resetting mechanism configured to set and/or maintain the pretension of the pretensioning device independently of the tensioning mechanism.

12. The electrohydraulic system as claimed in claim 1, wherein the actuating arrangement further comprises a hydraulic motor with a rotary drive, the hydraulic motor operably coupled to the actuating shaft between the first and second ends of the actuating shaft.

13. The electrohydraulic system as claimed in claim 1, wherein the electrohydraulic system is configured as an independent module.

14. The electrohydraulic system as claimed in claim 1, wherein the tensioning device is an electromechanical tensioning device.

15. The electrohydraulic system as claimed in claim 1, further comprising:
   an interface at the second end of the actuating shaft that is configured to couple to the external actuator or robot so as to transmit torque from the external actuator or robot to the actuating shaft.

16. The electrohydraulic system as claimed in claim 11, wherein the tensioning device is an electromechanical tensioning device.

* * * * *